June 6, 1950     A. M. THOMSEN     2,510,668
METHOD OF CONVERTING WOODY SUBSTANCES
Filed Oct. 8, 1945
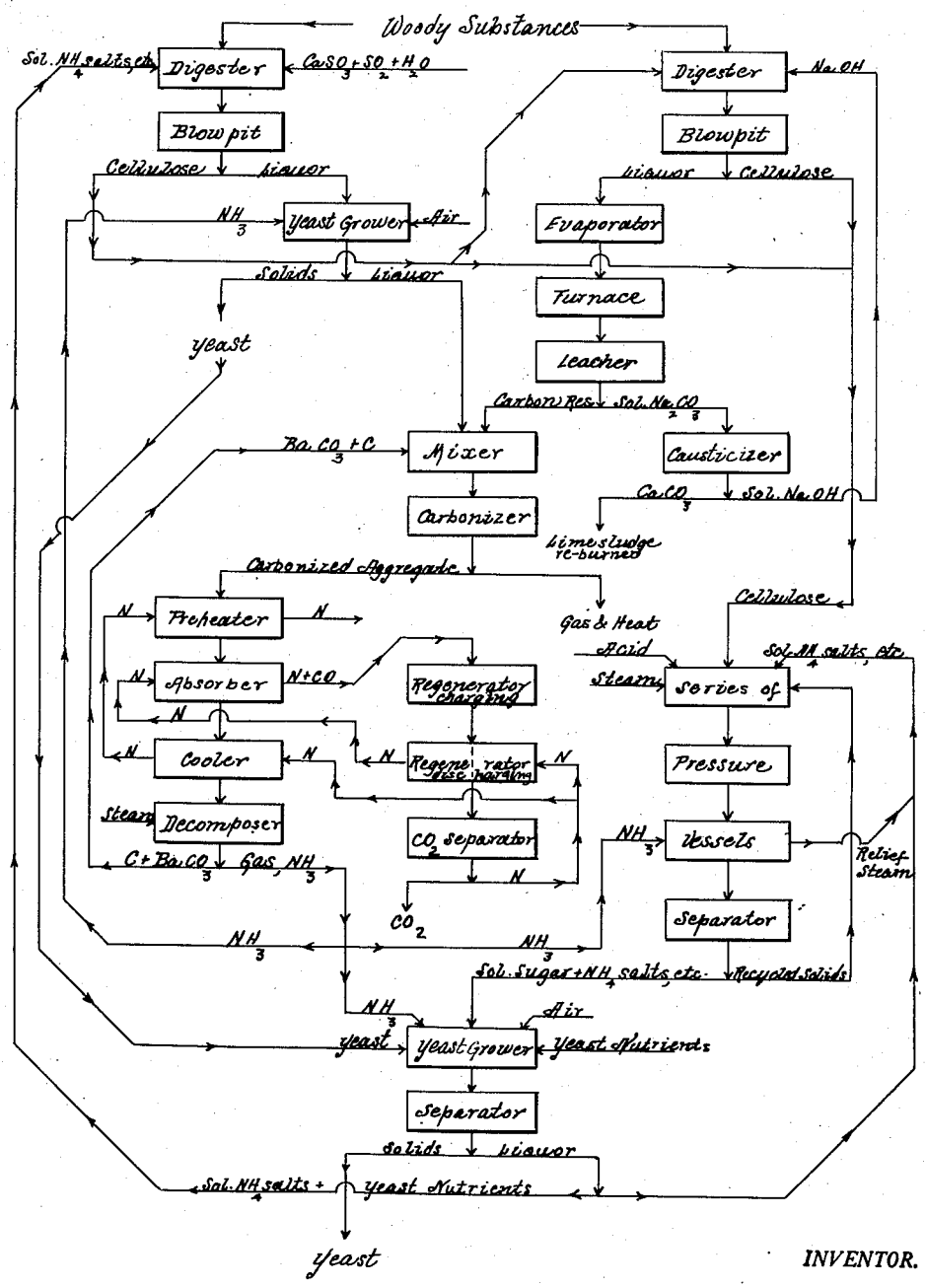
INVENTOR.
Alfred M. Thomsen Patented June 6, 1950

2,510,668

UNITED STATES PATENT OFFICE 2,510,668

METHOD OF CONVERTING WOODY SUBSTANCES

Alfred M. Thomsen, San Francisco, Calif.

Application October 8, 1945, Serial No. 620,995

4 Claims. (Cl. 127—37)

By the commonly accepted meaning of the word "yeast" this is a generic term for the type of micro-organism that induces fermentation in a sugar solution. It may be produced for this type of work in industry or it may be wanted for the combination of carbohydrate and protein of which it is formed. In any event, it requires for its life functions some form of sugar; some source of combined nitrogen, organic or inorganic; as well as phosphoric acid, potash, magnesia, etc., constituents of its ash; and oxygen in greater or lesser quantity in accordance with the purpose for which it is to be used.

By "woody substances," of course, is meant material partaking of the nature of wood, that is: A complex of cellulose fibers cemented with wood gums and lignin. My process consists in general of so treating woody materials that the cellulose and wood gum produce the sugar and the lignin becomes the means of obtaining the essential combined nitrogen from the atmosphere. Simultaneously, such of the ash forming constituents of the yeast as are present in the raw material can be utilized. This is particularly true if the raw material be such substances as sugar cane bagasse or other highly lignified members of the order of "grasses," or the stalks of the cotton plant, or similar agricultural by-products.

Portions of this disclosure are not new. The saccharification of cellulose resident in wood, with more or less modified lignin as a by-product, is old in Germany and has recently appeared in the United States. Similarly, in the sulphite pulp industry wood gums are hydrolysed into sugars, and these in turn enter into yeast when alcohol is made from the waste cooking liquors. It is unavoidable, therefore, that some repetition of the facts will remain as components of a composite process which, however, in its elementals is still new.

While it may seem the essence of simplicity to employ wood directly in a saccharification process, I find it far simpler to de-lignify said wood first and then to saccharify the relatively pure cellulose. This makes possible sundry improvements in this latter step which could not be advantageously used on crude wood. Also, the spent cooking liquor can be made the means of obtaining the combined nitrogen needed in subsequent yeast culture, while the sugar exhausted wort from yeast culture, which still retains valuable inorganic yeast foods, can then be recycled and almost perfect utilization obtained.

Such improvements appear to best advantage when the flow sheet attached hereto is analysed in detail but it is deemed advantageous to first explain in general the procedure therein specifically set forth. Thus, I prefer to delignify the raw materials with a caustic soda cook thus obtaining a purified form of cellulose and a spent cooking liquor. This liquor is then evaporated and incinerated so as to leave as large a carbonaceous residue as possible. This carbon is then agglomerated with barium carbonate and an appropriate binder and exposed to the action of highly heated nitrogen gas which is absorbed thereby. Subsequent treatment with steam yields ammonia and regenerated barium carbonate for re-use.

The ammonia thus produced not only furnishes the nitrogen needed for yeast culture but it also plays an equally important role in the saccharification of the cellulose. Both cellulose and lignin components of the wood are thus converted into one substance, yeast.

The binder for the finely divided carbon obtained in incinerating the cooking liquor could be anything which will leave a sufficient amount of cementing carbon to leave a coherent, porous mass when exposed to nitrogen absorption temperatures which are in excess of 2000° F. Asphalt and tar would serve, but it will be far better if wood be again the source of the raw material for such binder.

Singularly appropriate is the waste liquor that is produced when wood is digested with calcium bisulphite cooking liquor as in the orthodox sulphite pulp operation. If the finely divided carbon from the caustic soda recovery step be commingled with barium carbonate and the aforementioned waste liquor from a sulphite cook and carbonized, then a very satisfactory coke will be produced for subsequent nitrogen treatment.

Manifestly, such a waste liquor will contain some sugar derived largely from wood gum and hydro-celluloses, hence on the addition of ammonia and other yeast nutrients it can itself produce a limited amount of yeast. If this yeast be, in turn, added to the relatively pure wort from cellulose saccharification then the objectionable constituents which it has derived from the sulphite waste liquor will be eliminated during progressive yeast growth. It is, of course, essential that all such yeast culture be in the presence of sufficient oxygen so that no alcohol be produced but that in lieu thereof there be obtained the maximum growth of the plant itself.

Such removal of sugar does not seriously detract from the use of the waste sulphite liquor as a binder for the finely divided carbon obtained in the recovery step of the alkaline digestion. Furthermore, the basic character of the lime salts that are thus introduced into the coke have no deleterious effect on the commingled barium carbonate when subsequently exposed to the high temperatures of the nitrogen absorption step.

The two digestion steps so far enumerated are thus seen to partake of the standard pulp steps of today so nothing further need be said by way of explanation, but the same is not true of the cellulose saccharification step nor of the ammonia step. A definitely new technique is introduced in each case as will now be elucidated.

The purified cellulose is first commingled with water to such an extent that it can be processed in continuous flow, and this water contains a definite amount of ammonia and other yeast nutrients. It is then acidified with a mineral acid, sulphuric being preferred, to an extent dependent upon the character of the cellulose acted upon, but never more than a 2% solution.

The resultant magma, before said acidification, is then heated to proper saccharification temperatures, which is anything from a saturated steam pressure of 70 pounds to 120, but it will in general be found best to operate below 100 pounds' gage pressure. The time element will also vary with the character of the cellulose, and with acid concentration and temperature, but it is never permitted to reach conclusion, that is, there must always be a portion of the cellulose left undecomposed. This residual may be anything from a low of 20% to a high of 80%, and I prefer to operate at somewhere near a 50% conversion. In this manner I obviate as much as possible the destruction of the sugar previously formed.

As soon as the predetermined conversion to sugar has been obtained the free acid of the solution is at once neutralized with ammonia gas, the corresponding salt of ammonia being produced. Further conversion of cellulose is thus at once inhibited, and so is the destructive action of the acid upon the sugar which has been produced by hydrolysis.

The pressure is now reduced, stepwise, to atmospheric by passing the magma through a series of locks thus obtaining steam under varying pressures. Separation is then made between the residual cellulose and the sugar solution and the latter cooled to proper temperatures for yeast growing, that is below 100° F., best accomplished in a heat exchanger as will be referred to hereafter. The cellulose is recycled and the solution of sugar, ammonia salts and yeast nutrients is now added to strongly growing yeast under intense aeration. As this is but standard practice no description will be given.

Separation is finally made between the virtually sugar free exhausted liquor and the yeast, the exhausted liquor being utilized as the hydrolysing medium for cellulose by heating and acidifying same. Such heating is made almost entirely at the expense of the heat released in the previously described steps; thus, it will be evident that the heat abstracted in the cooling of the sugar solution in a heat exchanger can be substantially absorbed by said spent yeast culture medium, if it be passed through this same device, counter current to the medium being cooled.

Similarly, the steam evolved on reduction of pressure, being a stepwise procedure, can be used to bring said spent liquor up almost to the initial pressure, thus requiring but little fresh steam to inaugurate a new cycle. For the sake of simplicity of apparatus such heating is best done while the solution is approximately neutral.

The heated solution is then commingled with fresh cellulose, acidified with a mineral acid to the same extent as before and the cycle of saccharification is recommenced. The hydrolysis of cellulose is thus seen to be limited between the acidification step and the neutralizing step, while all other conditions required for saccharification are maintained.

The ammonia step is equally novel. There is, of course, nothing new in the chemistry employed, but there is in its application. When nitrogen is absorbed in a mixture of carbon and barium carbonate much heat is required. This is furnished by preheating the nitrogen in excess of the critical temperature and permitting it to serve as the heat carrier of the reaction. Such heating is done through heat recuperation from the end products of the reaction. When highly heated nitrogen is passed through the absorber it is consequently reduced in temperature but simultaneously it acquires a definite percentage of carbon monoxide. I prefer to keep this amount between 2% and 6% of the nitrogen.

If this mixture be now commingled with highly heated air in an amount sufficient to convert the CO to $CO_2$, then the products of the reaction will be well above that of the initial temperature of the nitrogen when it entered the absorber. If a higher temperature be desired it can evidently be obtained by adding additional fuel and sufficient additional air to consume the same.

Said products of combustion can now be made to impart nearly all of their heat to a brick checkerwork; and this, in turn, on reversal of flow, can impart its heat to the nitrogen gas with which the operation was commenced. The gases, cooled by passing through said checker can then be further cooled and stripped of the $CO_2$ by such means as water and compression, or chemically, as by scrubbing with an alkaline medium.

In this manner, the air employed to burn the CO produced furnished a continuous replacement for the nitrogen absorbed in the operation. The temperature of the nitrogen is optional as long as it is above 1800° F., but I prefer to work between 2000° and 2500° F. If the temperature be below the former figure then very little CO can be formed before the temperature drops to the lower limit of the reaction, and if it is much above 2500° F. then the barium compound produced becomes sensibly volatile.

The decomposition of the nitrogenized mass by means of steam is well known and need not be further described, but needless to say, it must be conducted at temperatures below the decomposition point of the ammonia produced to avoid losses. I prefer to effect such cooling by passing cold nitrogen through the hot mass leaving the absorber, and in turn to use the heat thus made available to preheat the charge being fed into the absorber.

In equipment for such an operation I prefer a substantially vertical shaft, divided by constrictions into a series of "zones," so superimposed upon one another that material is fed continuously downward as fast as it is removed from the lowest zone. In the first zone there would take place a preheating of the charge by means of the heated nitrogen issuing from the third, or cooling, zone. In the second zone, heating by means of very hot nitrogen would take place with simultaneous absorption of a portion of said nitrogen and formation of CO. The next lower zone would be the cooling zone already referred to and finally there would be the decomposing zone where superheated steam would be admitted. There would be some admixture between "zones" which constrictions and regulation of pressure will not be enough to prevent, but such admixture would be always in the direction of nitrogen losses which are of no moment as it is present in large excess as already mentioned.

The heating of the nitrogen would be in any orthodox fashion such as is so successfully used in the steel industry, and as already indicated it would as a matter of economy be heat recuperative. As already stated, little if any additional fuel should be required save that resident in the CO formed in the operation of the process.

After these preliminary descriptions it should be simple to follow the flow sheet. The operation commences with an acid and an alkaline digestion of a "woody substance," respectively. From the acid phase issues two products, cellulose and spent liquor. The cellulose is either retreated in the alkaline phase, if it be incomplete, or else directly commingled with the cellulose obtained in alkaline digestion.

The spent cooking liquor from the alkaline phase is evaporated and incinerated as in standard soda practice and then leached to recover its soda salts separate and distinct from the carbonaceous residue. This latter is in turn commingled with the spent liquor from the acid phase digestion, after the removal of the resident sugar through yeast culture, and carbonized, thus producing a medium that is acceptable in nitrogen fixation. The recovered soda salts are causticized and recycled to the alkaline digestion, the lime sludge being reburned.

The cellulose from both digestions is now commingled with a re-cycled liquor containing ammonia salts, yeast nutrients, and almost neutral in character, or at most slightly acid. The resultant magma is raised to saccharification temperatures and pressures and then acidified with a mineral acid, passed continuously through a series of pressure vessels equipped with acid resistant linings, until the predetermined amount of conversion has taken place, when ammonia is admitted and all action stopped by neutralization of the resident free acid.

As represented on the flow sheet, steam, acid, and re-cycled fluid containing ammonia salts, etc., are commingled with one another in the first of the series of pressure vessels, the second vessel represents only a continuation of saccharification until the time element has been satisfied; while the third vessel shows the addition of ammonia and the release of relief steam, the heat of the latter being absorbed in the re-cycled medium.

From the "series of pressure vessels," the magma now passes to the separator where re-cycle cellulose is split off from a solution containing sugar and yeast nutrients. This solution is now added under intense aeration in the "yeast grower" where it becomes commingled with the yeast obtained in the sulphite liquor step, said yeast thus becoming duly purified.

When said solution has thus been stripped of its sugar, and such inorganic materials as has been accepted by the yeast and made a component thereof, it is once more separated from said yeast and is then shown as being re-cycled to the head pressure vessel as before described. However, as water is constantly entering the circuit, and as sundry impurities derived from the hydrolysis of cellulose have a tendency to render same too impure for proper yeast culture, a portion is shown split off and sent to the sulphite digester. In this manner, undue dilution is avoided, the resident inorganic yeast nutrients are employed in yeast culture in the acid digestion phase, and the resident organics are decomposed in subsequent carbonization.

It is now required to show the source of this ammonia. The carbonized residuum from the "carbonizer," consisting of re-cycled barium carbonate, carbon, and ash constituents of the waste sulphite liquor enters first in a pre-heater, where it is heated by heat transference from the cooling phase through the instrumentality of inert nitrogen gas.

It then passes to the "absorber" where it is heated to reaction temperature, nitrogen is absorbed and CO is produced. To illustrate the manner of the heating of this nitrogen I have indicated the "regenerator" as in double form, one part absorbing heat and the other part releasing heat. Air enters the "charging" regenerator to burn the commingled CO, and the cooled gas leaves this same regenerator, not the one next below in the series. To properly illustrate this I have used a "dotted line" traversing said regenerator to indicate that it is not a part of the downward gas flow but only of the up-flowing nitrogen in the heating phase. The separation of the $CO_2$ formed in the combustion in the upper regenerator is then indicated, with discard of said $CO_2$ and recycling of the purified N.

From the absorber the charge descends to the cooler where it is traversed by cold N, which thus becomes heated and, in turn, heats the charge in the pre-heater. When sufficiently cooled the charge passes to the decomposer where it is treated with superheated steam which regenerates the barium carbonate and releases the absorbed nitrogen in the form of ammonia.

Barring the need for small amounts of ash-forming ingredients it will be seen that yeast culture is made directly dependent upon woody materials for its two principal requisites, namely, sugar and ammonia, the latter being ultimately dependent upon atmospheric nitrogen. The gradual accumulation of lime salts, derived from the sulphite digestion will ultimately require a discard of a part of the circulating mass from which the barium can be separated by orthodox barium chemistry. It should be noted that magnesium base cooking liquor can replace the ordinary lime base sulphite cooking liquor should the change ever be found advantageous, magnesia salts being as non-volatile and inert as the corresponding salts of lime.

While the flow sheet gives all these items in the form of a comprehensive whole, I necessarily do not limit myself to this disclosure, in toto, but I consider the separate items as well as being original with myself. The flow sheet is to be considered but as a preferred version of an idealized condition which can also be operated in a divided form. Similarly, I have made no mention of the obvious fact that my yeast process provides in a most favorable form a "framework" into which many well known features that today lack importance by themselves could be advantageously fitted. These means are known and their insertion would constitute a definite economic advantage. I refer to such items as the recovery of methanol and acetone from the carbonizing steps when applied to the spent liquors from both the acid and alkaline digestion herein employed, to the recovery of turpentine and alcohol from relief discharges, and to the recovery of resinous products from spent liquors prior to their incineration. The inclusion of such matters are obvious.

Having thus described my process, I claim:

1. The method of saccharifying cellulose to obtain a medium suitable for yeast culture which comprises; commingling a purified form of cellulose, obtained by a preliminary digestion of woody substances with a water solution of alkali metal hydroxide and separation of the soluble products thus obtained, with water in such proportion as shall produce a magma of mobile consistency; heating said magma by the direct admission of steam while in a state of flow to saccharifying temperatures, being from 100° to 180° C. under superatmospheric pressure; acidifying said magma and maintaining same under said saccharifying temperature until a predetermined but partial degree of conversion has been reached; neutralizing the acidity of said magma; releasing the pressure with consequent evolution of relief steam; separating the sugar solution from the unconverted cellulose; and returning the unconverted cellulose to the initial step of the process.

2. The method of saccharifying cellulose to obtain a medium suitable for yeast culture which comprises; commingling a purified form of cellulose obtained by a preliminary digestion of woody substances with a water solution of alkali metal hydroxide and separation of the soluble products thus obtained, with water containing a dissolved salt of ammonium in such proportion as shall produce a magma of mobile consistency; heating said magma by direct admission of steam while in a state of flow to saccharifying temperatures, being from 100° C. under superatmospheric pressure; adding a mineral acid to said magma to attain a predetermined state of acidity, said acidity being less than the equivalent of 2% of sulphuric acid; maintaining said acidified magma under said saccharifying temperatures until a predetermined, but partial, state of conversion of cellulose into sugar shall has been attained; adding ammonia to the magma to inhibit further conversion of cellulose to sugar by neutralizing the added mineral acid; thus forming the corresponding ammonium salt; releasing the pressure of the magma to atmosphere in stepwise fashion, thus obtaining the evolved relief steam under diverse pressures; separating the residual cellulose from the dissolved hydrolysed products; and returning the unconverted cellulose to the initial step of the process.

3. The method of saccharifying cellulose set forth in claim 1, with the added step that heat resident in the relief steam evolved therein be transferred to the colder magma in the heating stage.

4. The method of saccharifying cellulose set forth in claim 2, with the added step that the heat resident in the relief steam evolved therein under diverse pressures be transferred to the colder magma which thus becomes, stepwise, raised to a higher temperature.

ALFRED M. THOMSEN.

REFERENCES CITED

The following references are of record in the file of this patent:

UNITED STATES PATENTS

| Number | Name | Date |
| --- | --- | --- |
| 141,072 | Pasteur | July 22, 1873 |
| 1,680,643 | Hefjkenskjold | Aug. 7, 1928 |
| 1,687,785 | Peri | Oct. 16, 1928 |
| 1,947,671 | Bartling | Feb. 20, 1934 |
| 2,086,701 | Dreyfus | July 13, 1937 |
| 2,188,193 | Scholler | Jan. 23, 1940 |
| 2,197,059 | Seidel | Apr. 16, 1940 |
| 2,198,785 | Mohr et al. | Apr. 30, 1940 |
| 2,222,885 | Thomsen | Nov. 26, 1940 |
| 2,233,243 | Burns | Feb. 25, 1941 |
| 2,305,833 | Warth | Dec. 22, 1942 |

FOREIGN PATENTS

| Number | Country | Date |
| --- | --- | --- |
| 16,262 | Great Britain | of 1904 |
| 204,073 | Canada | Jan. 16, 1912 |
| 17,846 | Great Britain | of 1915 |
| 315,462 | Great Britain | July 15, 1929 |
| 501,513 | Great Britain | Feb. 28, 1939 |
| 536,759 | Great Britain | May 27, 1941 |